(12) United States Patent
Cao et al.

(10) Patent No.: US 11,748,617 B2
(45) Date of Patent: Sep. 5, 2023

(54) WEIGHT MATRIX PREDICTION

(71) Applicant: International Business Machines Corporation, Armonk, NY (US)

(72) Inventors: Li Cao, Beijing (CN); Ze Ming Zhao, Beijing (CN); Xiao Tian Xu, Changde (CN); Yi Shan Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 17/016,503

(22) Filed: Sep. 10, 2020

(65) Prior Publication Data
US 2022/0076113 A1    Mar. 10, 2022

(51) Int. Cl.
*G06N 3/08* (2023.01)
*G06F 18/25* (2023.01)
*G06F 18/21* (2023.01)
*G06F 18/20* (2023.01)

(52) U.S. Cl.
CPC ............ *G06N 3/08* (2013.01); *G06F 18/217* (2023.01); *G06F 18/25* (2023.01); *G06F 18/285* (2023.01)

(58) Field of Classification Search
None
See application file for complete search history.

(56) References Cited

U.S. PATENT DOCUMENTS 10,733,535 B1 * 8/2020 Corrado ................. G06N 20/00
2018/0341851 A1   11/2018 Chung et al.
2021/0064665 A1 *  3/2021 Zhao ................. G06F 16/90328

OTHER PUBLICATIONS

Ben-Nun T, Hoefler T. Demystifying parallel and distributed deep learning: An in-depth concurrency analysis. ACM Computing Surveys (CSUR). Aug. 30, 2019;52(4):1-43. (Year: 2019).*
Dean J, Corrado G, Monga R, Chen K, Devin M, Mao M, Ranzato MA, Senior A, Tucker P, Yang K, Le Q. Large scale distributed deep networks. Advances in neural information processing systems. 2012;25. (Year: 2012).*
Chilimbi, Trishul, et al. "Project adam: Building an efficient and scalable deep learning training system." 11th USENIX symposium on operating systems design and implementation (OSDI 14). 2014. (Year: 2014).*
Gupta et al., "Model Accuracy and Runtime Tradeoff in Distributed Deep Learning: A Systematic Study", arXiv:1509.04210v3 [stat. ML] Dec. 5, 2016, 10 pages.

(Continued)

*Primary Examiner* — Clifford Hilaire
(74) *Attorney, Agent, or Firm* — Jeffrey M. Ingalls

(57) ABSTRACT

Embodiments of the present disclosure relate to weight matrix prediction. In an embodiment, a computer-implemented method is disclosed. The method comprises sending a candidate weight matrix of a neural network to one of a plurality of computing nodes comprised in a computing system to perform a testing iteration. The method further comprises receiving a testing loss value from the one of the plurality of computing nodes based on the testing iteration. The method further comprises evaluating whether the testing loss value is applicable. The method further comprises determining that the candidate weight matrix is available to be employed in a new formal iteration in response to the testing loss value being applicable. In other embodiments, a system and a computer program product are disclosed.

20 Claims, 9 Drawing Sheets

(56) References Cited

OTHER PUBLICATIONS

Zhao et al., "Dynamic Stale Synchronous Parallel Distributed Training for Deep Learning", Conference Paper, Jul. 2019, DOI: 10.1109/ICDCS.2019.00149, 2019 IEEE 39th International Conference on Distributed Computing Systems (ICDCS), 12 pages.

Alain et al., "Variance Reduction in SGD by Distributed Importance Sampling", Workshop track—ICLR 2016, printed Jul. 31, 2020, 18 pages.

Xia et al., "FABA: An Algorithm for Fast Aggregation against Byzantine Attacks in Distributed Neural Networks", Proceedings of the Twenty-Eighth International Joint Conference on Artificial Intelligence (IJCAI-19), printed Jul. 31, 2020, 7 pages.

Mell et al., "The NIST Definition of Cloud Computing", Recommendations of the National Institute of Standards and Technology, U.S. Department of Commerce, Sep. 2011, 7 pages.

\* cited by examiner

WEIGHT MATRIX PREDICTION

BACKGROUND

The present disclosure relates to computer technologies, and more specifically, to a method, system and computer program product for weight matrix prediction.

Artificial Intelligence (AI) models/applications based on Artificial Neural Networks (ANN) are broadly employed in various fields. An ANN-based AI model needs to be trained by means of processing training datasets in a training process to evaluate whether an output of the training process is acceptable in accordance with a predetermined criterion before it can be employed in real scenarios. One purpose of a training of an ANN-based AI model is to choose an applicable weight matrix of the ANN. Generally, the large scale of training datasets may lead to an increase of training costs of the training process. For example, training costs may include time, requirements of computing resources, power consumption, etc.

SUMMARY

According to some embodiments of the present disclosure, there is provided a method, system and computer program product for weight matrix prediction.

According to one embodiment a computer-implemented method is provided. The method comprises sending a candidate weight matrix of a neural network to one of a plurality of computing nodes comprised in a computing system to perform a testing iteration. The method further comprises receiving a testing loss value from the one of the plurality of computing nodes based on the testing iteration. The method further comprises evaluating whether the testing loss value is applicable. The method further comprises determining that the candidate weight matrix is available to be employed in a new formal iteration in response to the testing loss value being applicable according to the evaluating.

According to other embodiments, a system is provided that comprises at least one processing unit and a memory coupled to the at least one processing unit and storing instructions thereon. The instructions, when executed by the at least one processing unit, perform acts which comprise sending a candidate weight matrix of a neural network to one of a plurality of computing nodes comprised in a computing system to perform a testing iteration. The acts further comprise receiving a testing loss value from the one of the plurality of computing nodes based on the testing iteration. The acts further comprise evaluating whether the testing loss value is applicable. The acts further comprise determining that the candidate weight matrix is available to be employed in a new formal iteration in response to the testing loss value being applicable according to the evaluating.

According to other embodiments, a computer program product is provided that comprises a computer readable storage medium having program instructions embodied therewith. The program instructions are executable by an electronic device to cause the electronic device to perform acts which comprise sending a candidate weight matrix of a neural network to one of a plurality of computing nodes comprised in a computing system to perform a testing iteration. The acts further receiving a testing loss value from the one of the plurality of computing nodes based on the testing iteration. The acts further comprise evaluating whether the testing loss value is applicable. The acts further comprise determining that the candidate weight matrix is available to be employed in a new formal iteration in response to the testing loss value being applicable according to the evaluating.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

Figure 1:
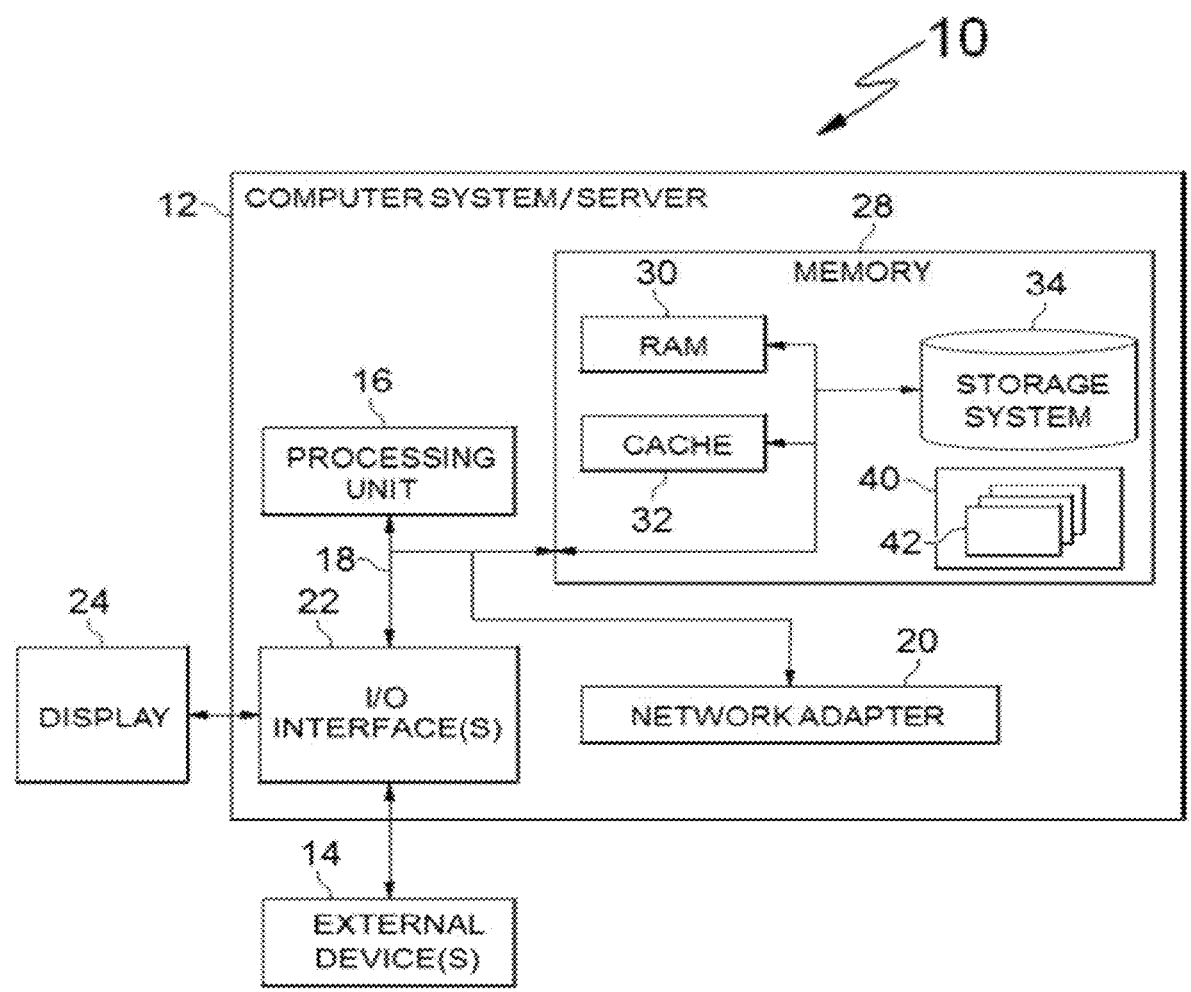
FIG. 1 depicts a cloud computing node according to an embodiment.

It should be appreciated that elements in the figures are illustrated for simplicity and clarity. Well-understood elements that may be useful or necessary in a commercially feasible embodiment may not be shown for the sake of simplicity and to aid in the understanding of the illustrated embodiments.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, the embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are applicable over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities applicable for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made applicable to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being performed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors 16 (or processing units), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any applicable media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination such that, may include an implementation of a networking environment. Program modules 42 generally carry out the functions and/or methodologies of the embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 2:
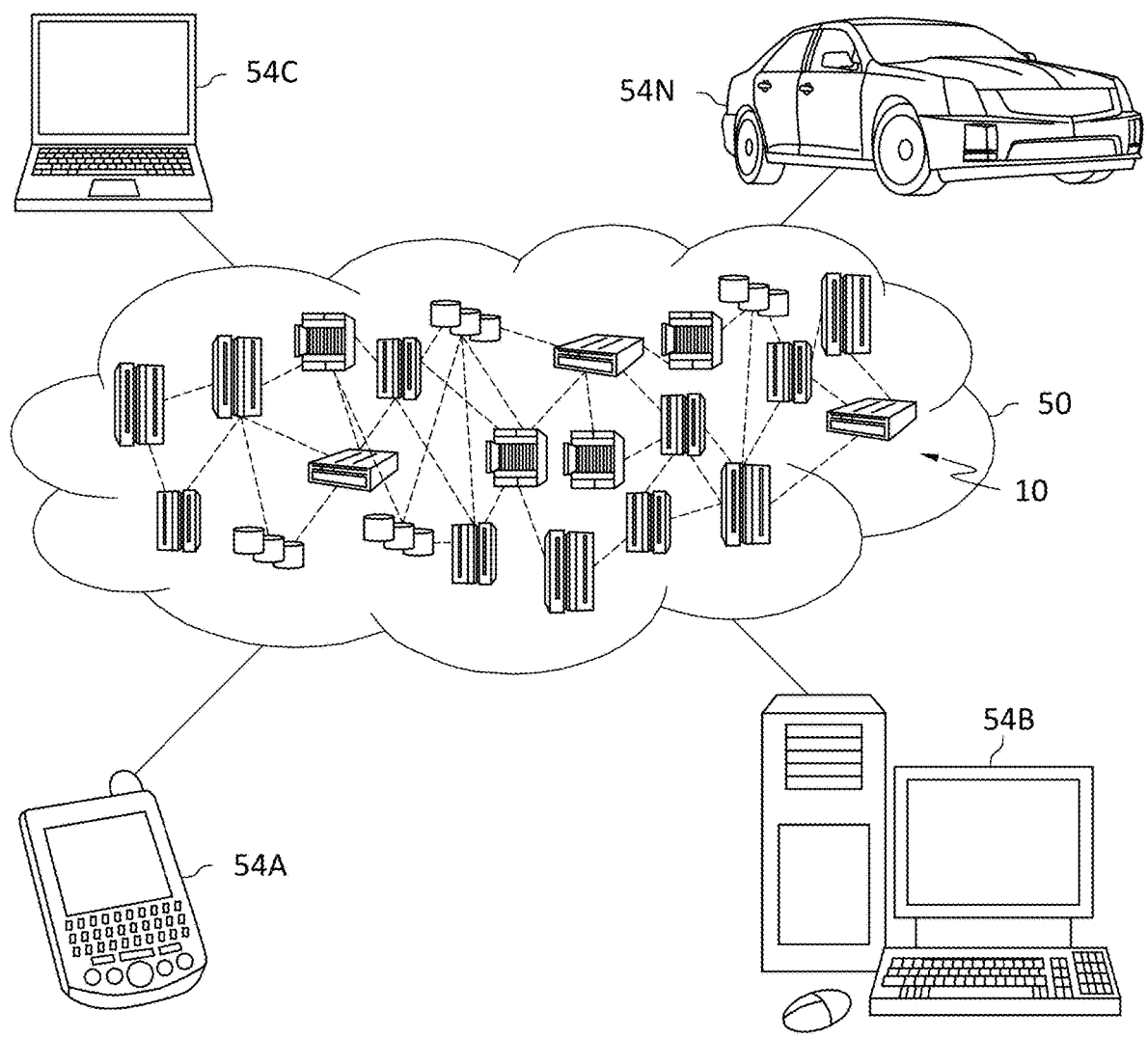
FIG. 2 depicts a cloud computing environment according to an embodiment.

Referring now to FIG. 2, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination such that. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
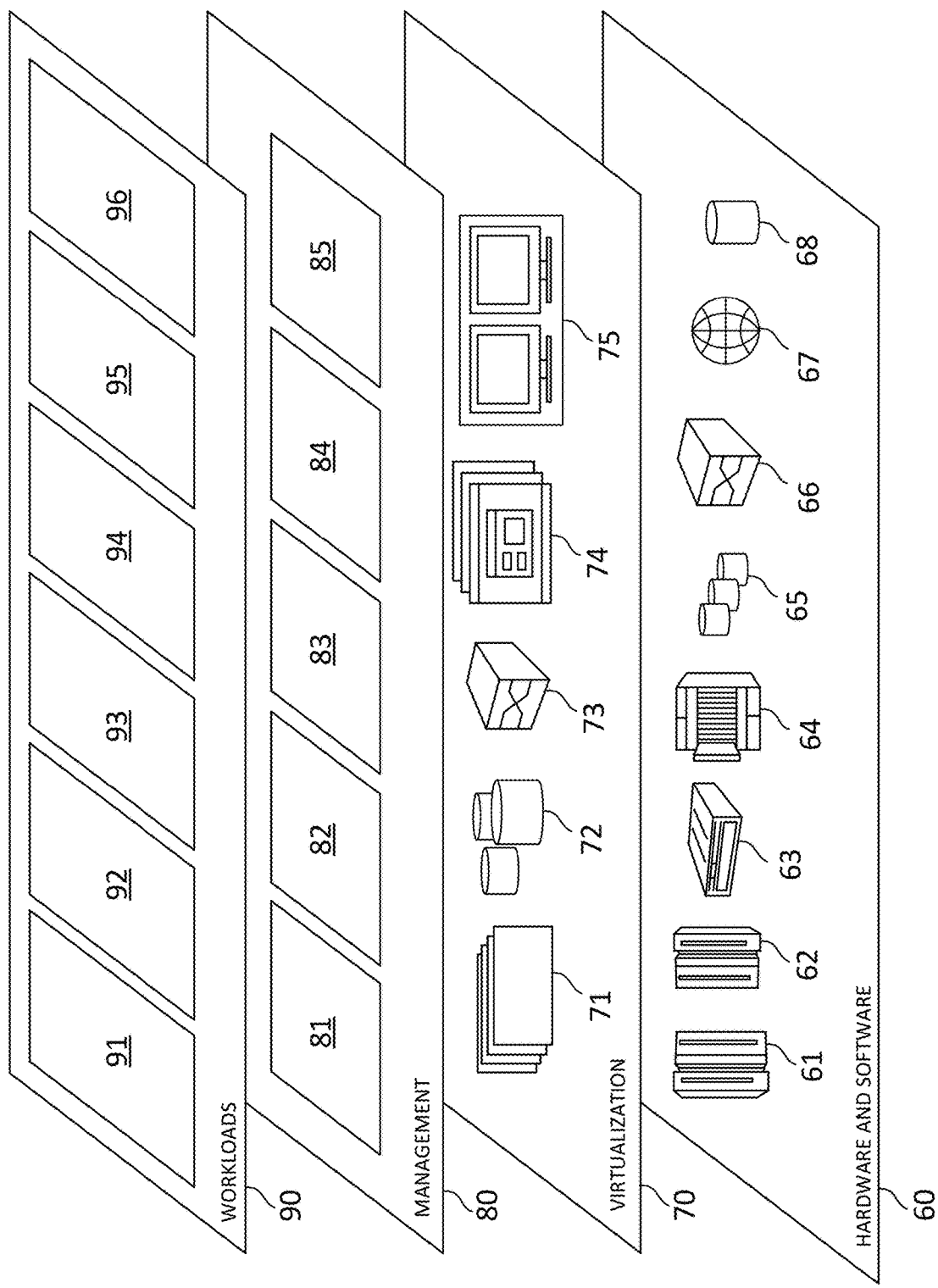
FIG. 3 depicts abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and the embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and weight matrix prediction 96 will be described in the following embodiments of the present disclosure.

Artificial Intelligence (AI) models/applications based on Artificial Neural Networks (ANN) are employed in massive domains, for instance, machine learning, image recognition, nature language processing or data analysis, etc. ANN-based AI models need to be trained by means of employing training datasets in training iterations to simulate the running status under actual running conditions before AI models can be employed in actual scenarios. A typical ANN-based AI model generally comprises a collection of interconnected units or nodes (known as artificial neurons) and interconnections therein (known as edges). Artificial neurons and edges can further be formed into different layers, for instance, an input layer, one or more hidden layers and an output layer. Each of the artificial neurons and each of the edges has a corresponding weight which together construct a weight matrix and can be adjusted by a training (which is sometimes called learning) process of an AI model to obtain an applicable weight matrix based on processing a training dataset.

Generally, a training dataset has a very large scale. Therefore, training costs produced from an AI model training process may become heavier and more expensive. For example, the training costs may include more training time, more requirements of computing resources or more power consumption. A dedicated GPU (Graphic Processing Unit) may be employed with a large quantity of parallel computing processors to speed up float point computing and distributed computing technology, and these may be widely employed to process data is cases where there is a large data volume and a heavy computing workload.

Furthermore, volatility may result from multiple factors that may occur in known training methods of ANN-based AI models. For example, volatility may result from variations of the training data collected from different data resources. Volatility may also result from the AI model training methods themselves. Also, volatility may result from the AI model training optimization methods employed in the training processes.

Figure 8:
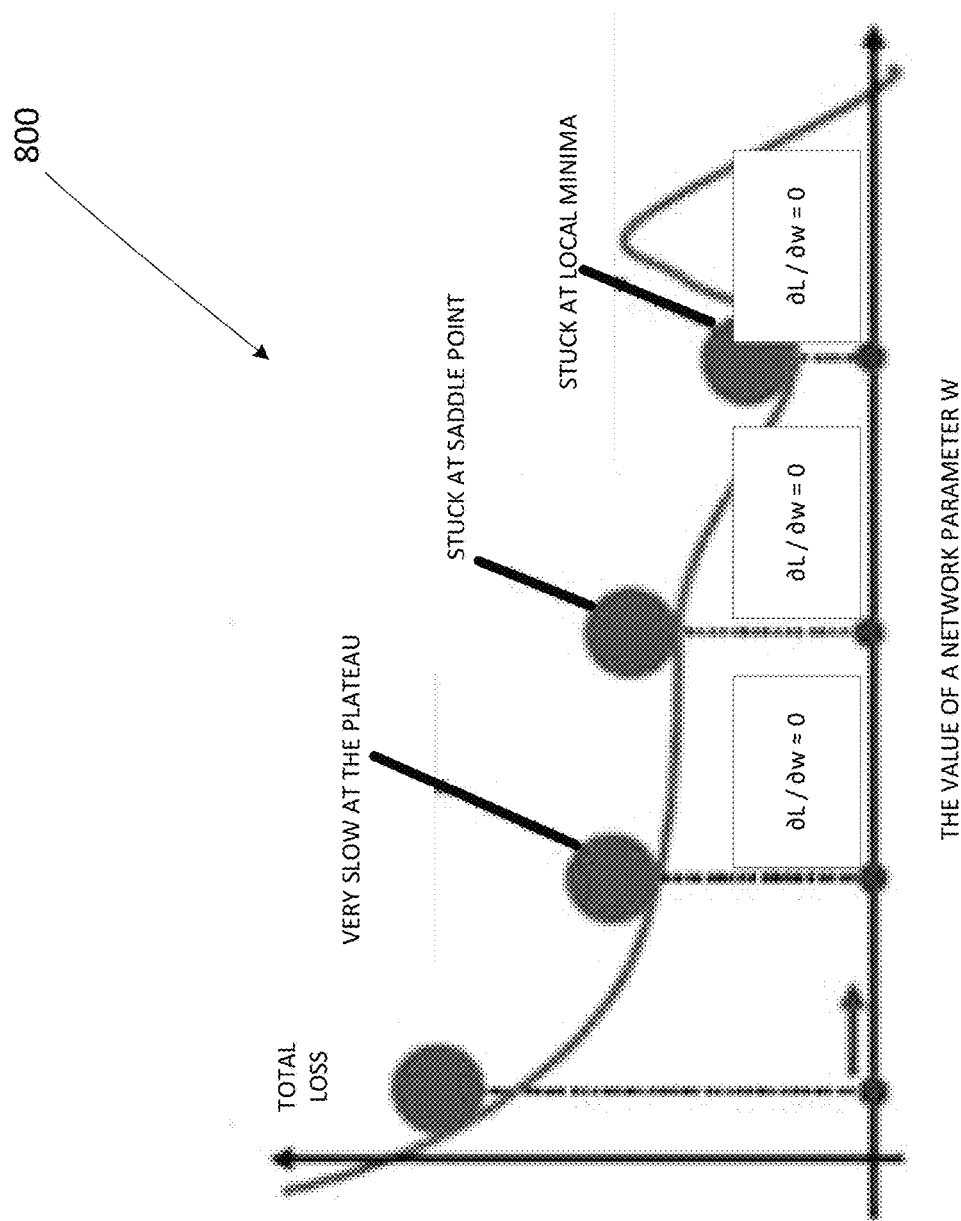
FIG. 8 depicts a Loss-Weight curve graph according to a known weight matrix optimizing method.

With reference now to FIG. 8, a curve graph 800 schematically illustrates a Loss-Weight (W) curve in accordance with an example training optimizing method for an ANN-based AI model based on gradient descent optimization. A horizontal axis of the curve graph 800 depicts a weight matrix referred to as W of the ANN-based AI model trained in training iterations in which the AI model with the weight matrix W processes a training dataset to generate a corresponding output, for instance, W is a specific weight matrix of an AI model for image recognition, and the corresponding output is an image data analysis result. It is notable that W is decreased along with the positive axis direction of the horizontal axis in the manner of gradient descent in FIG. 8. A vertical axis of the curve graph 800 depicts a loss value which is obtained in accordance with the corresponding output of the AI model training process generated in the present iteration and the output generated in the previous iteration. For example, the loss value is a deviation value between respective outputs generated in the present iteration and the previous iteration.

As illustrated in FIG. 8, generally the loss value decreases along with the gradient descent of W, however, a descent velocity at a certain point on the Loss-Weight curve is not a constant value and extraordinarily slow at some certain special points on the Loss-Weight curve. For example, points in a plateau segment at which a slope ($\partial L / \partial W$) of the Loss-Weight curve is approximately equal to zero, or a saddle point at which the slope of the Loss-Weight curve is equal to zero and the Loss-Weight curve becomes to bend upward or downward. Descent velocities characterized by slopes corresponding to points of a Loss-Weight curve indicates a converging speed of a training method/process employed to train an ANN-based AI model. In some instances, a training process of an ANN-based AI model has a significantly low running efficiency corresponding to a plateau segment of the Loss-Weight curve because the training process has a corresponding low converging speed. As a result, it leads to more training time costs and/or power consumption of the training process in a corresponding period. In other instances, a training process of an ANN-based AI model is stuck at a saddle point of the Loss-Weight curve because the training process has a divergent trend at a corresponding time point when the training process generates the saddle point of the Loss-Weight curve. The divergent trend may cause the training process to be non-convergent which would enormously increase the training costs in terms of training time, computing resources or power consumption, etc. Furthermore, training efficiency with respect to training ANN-based AI models by means of distributed computing systems is easily impacted by rare outlier computing nodes, for instance, clients, workers or workstations, comprised in distributed computing systems. It is normally referred to as the Barrel Effect. In addition, it should be recognized that the weight matrix of an ANN-based AI models trending to different divergent directions in course of training the AI model may be beneficial to helping the training to escape from a local minimum trap as shown in FIG. 8. A local minimum trap also causes a training process of ANN-based AI models to be stuck. However, as in the above description, a weight matrix of an ANN-based AI model trending to different divergent directions may also cause a training process to be non-convergent which would seriously influence the training efficiency. Therefore, weigh matrices with different divergent directions need a testing step rather than directly be employed on the AI model to avoid a fluctuant training consequence.

Accordingly, is may be desirable to address the aforementioned effects in training ANN-based AI models, especially with regard to quickly and effectively obtaining an applicable weight matrix for an ANN-based AI model.

Figure 4A:
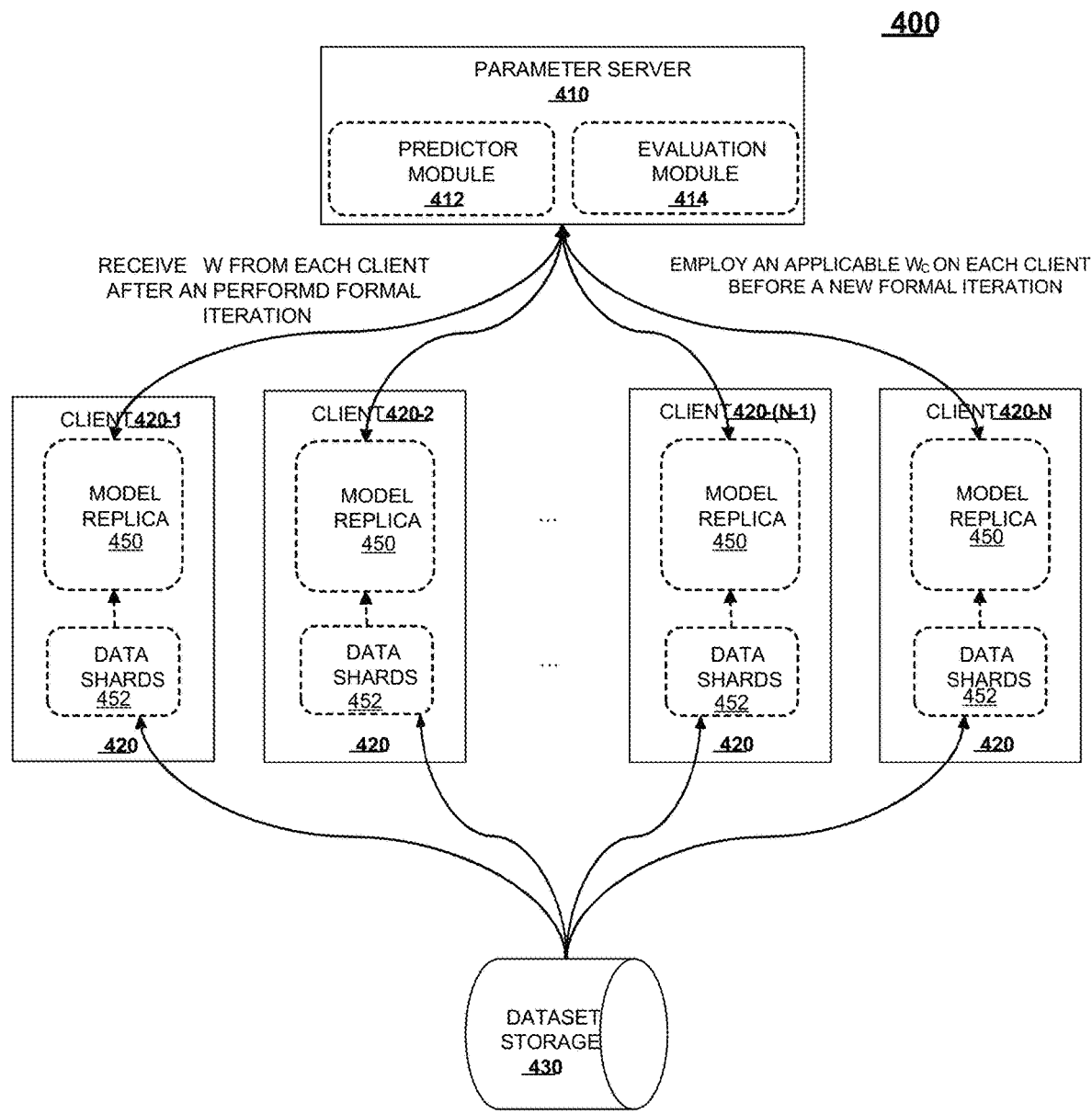
FIG. 4A depicts a block diagram illustrating an exemplary AI model training system comprising weight matrix prediction according to some embodiments.
Figure 4B:
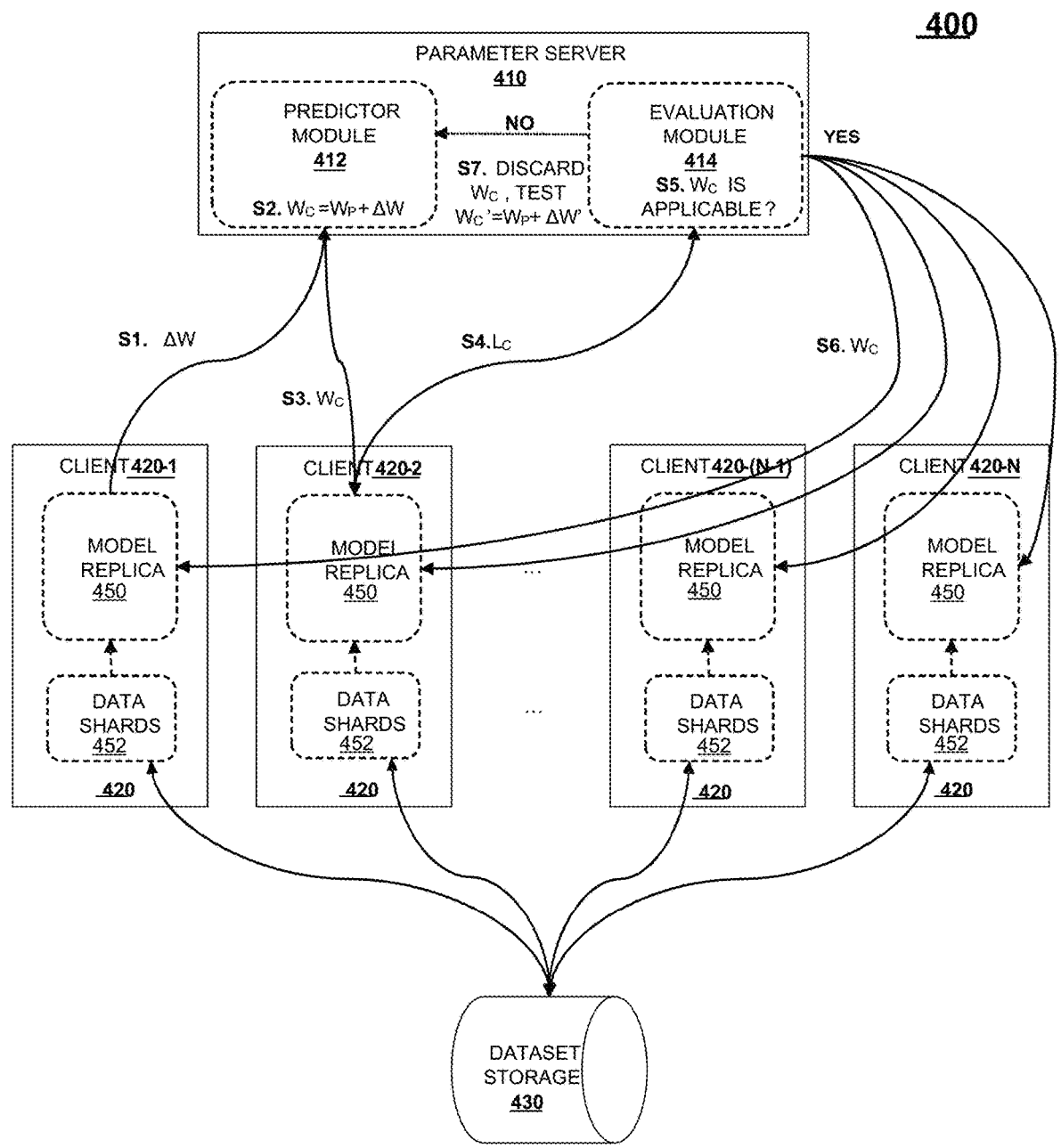
FIG. 4B depicts a block diagram illustrating an exemplary AI model training system comprising weight matrix prediction and a corresponding AI model training process according to some embodiments of the present disclosure.

As mentioned above, a method, system and computer program product for weight matrix prediction can be employed in course of training an ANN-based AI model, for instance, on the basis of a distributed computing system. FIGS. 4A and 4B depict block diagrams illustrating an AI model training system 400 according to some embodiments of the present disclosure. It should be appreciated that the arrangement of elements or modules in FIGS. 4A and 4B and the number thereof are provided for the purpose of illustration only. In other embodiments, AI model training system 400 may include more, less and/or different elements or modules and different arrangements.

According to some embodiments of the present disclosure, an AI model training system 400 is provided to implement a computer-implemented method for weight matrix prediction which will be described in the present disclosure. The AI model is based on an ANN and may be trained to perform a certain application (or to achieve a certain purpose) before it can be employed in the actual application or running environment. AI model training system 400 comprises parameter server 410, a plurality of clients (computing nodes) (420-1, 420-2 . . . 420-$n$-1, 420-$n$, collectively called clients 420) and dataset storage device 430. Parameter server 410 comprises prediction module 412 and evaluation module 414. Notwithstanding, AI model training system 400 depicted in FIG. 4 comprises the aforementioned modules, but there is no limitation to modules or elements comprised in AI model training system 400. AI model training system 400 may comprise other modules or elements for implementing more functionalities and objectives in accordance with various user requirements and experiences.

In some embodiments of the present disclosure, AI model training system 400 is implemented in a distributed computing environment, for instance, a cluster computing environment, a grid computing environment, a server/client network computing environment or a cloud computing environment, etc. A distributed computing environment can implement AI model training system 400 by components of the distributed computing environment comprising hardware, software or their combinations. According to performance and capability based on a distributed computing environment, AI model training system 400 can perform the computer-implemented method for weight matrix prediction which will be described in the present disclosure.

In some embodiments of the present disclosure, AI model training system 400 may be deployed on remote computing platforms, for example, a cloud computing platform and/or a cloud storage service system which can provide remote computing source to implement at least a part of functionalities of AI training system 400 and provide respective computing resource, information source or supporting services, for instance, massive remote storage space for training dataset. In these embodiments, the remote computing platforms would be resilient and adapted to computing performance, storage capacity, response speed, display effect and the like in accordance with user requirements.

In some embodiments of the present disclosure, AI model training system 400 comprises a parameter server 410, clients 420 and a dataset storage device 430 which are communicated by means of a network, for instance, a local area network (LAN), a general wide area network (WAN), a public network (e.g., the Internet) or a combination of them via network adapters (e.g., network adapter 20 shown in FIG. 1). Parameter server 410 provides neural network parameters to the AI model in period of the AI model training process, for instance, iteratively providing weight matrixes of ANN to the AI model for adjusting the output of the AI model training process to be consistent with an expectational value/result. In some embodiments, for the aforementioned objectives or functionalities, parameter server 410 receives a plurality of weight matrix variations from clients 420 via the network as shown in FIG. 4A. The plurality of weight matrix variations are generated by clients 420 (act as computing nodes) after a formal iterative calculation referred to as a formal iteration which is performed by clients 420. In the present disclosure, it may be defined as a formal iteration that all clients of clients 420 preform an iterative calculation by means of the same weight matrix and generate outputs based on inputs coming from the same training dataset. Clients 420 generate the plurality of weight matrix variations by means of various known applicable weight matrix adjusting/optimizing methods or algorithms in the art, for instance, Gradient Descent, Stochastic Gradient Decent, Mini Batch Gradient Descent or adaptive moment estimation, etc. Based on receiving the plurality of weight matrix variations, parameter server 410 comprising predictor module 412 and evaluation module 414 further performs a weight matrix prediction to generate a candidate weight matrix referred to as $W_C$ as shown in FIG. 4A. The parameter server 410 also evaluates the candidate weight matrix to determine that the candidate weight matrix is applicable to a new formal iteration which performs an iteration on all clients using an applicable candidate weight matrix. As a result, based on the weight matrix prediction, parameter server 410 employs an applicable candidate weight matrix on each of the clients 420 to perform the new formal iteration.

In some embodiments of the present disclosure, clients 420 comprises a plurality of clients which are constructed into a distributed computing system for performing an AI model training process. The performance of each client, for instance, computing speed, storage capability, power consumption or workload, and the number of clients is determined and adjusted in accordance with specific requirements of an AI model training process. Therefore, the total performance of clients 420 has an extensibility and flexibility, and clients 420 are appropriate for processing an AI model training with complex calculations and massive training data. A model replica 450 of the AI model and training data shards 452 corresponding to the model replica 450 are deployed on each client of clients 420.

In some embodiments of the present disclosure, dataset storage device 430 is in communication with clients 420 and provides a training dataset to clients 420 via the network for the AI model training process. Dataset storage device 430 can employ various applicable data storage devices for storing a huge scaled training dataset. The training dataset can include any kind of data, for instance, images, sounds, texts, videos or geographic location information, etc. In some embodiments, the training dataset are divided into data shards 452 and provided to clients 420 by the dataset storage device 430 in response to a client accessing the dataset storage device 430 and requesting training data. In other embodiments, the training dataset is initiatively sent to clients 420 as data shards 452 by the dataset storage device 430 which follows a preset policy or program logic.

It should be noted that the system with weight matrix prediction function referred to as AI model training system 400 according to some embodiments of this disclosure could be implemented by computer system/server 12 as shown in FIG. 1 and distributed cloud computing environment 50 as shown in FIGS. 2 and 3, for instance, a plurality of cloud computing nodes 10 perform the AI model training process in distributed cloud computing environment 50 which further comprise respective cloud components implementing functions as parameter server 410 and the dataset storage device 430. Here, the system of weight matrix prediction is exemplarily and abstractly illustrated by a block diagram which does not explicitly exhaust or precisely limit entirety or components of AI model training system 400 with weight matrix prediction as shown in FIG. 4.

With reference now to FIG. 4B, an exemplary block diagrams further illustrates how AI model training system 400 implements a weight matrix prediction according to some embodiments of the present disclosure.

At operation S1, parameter server 410 receives a weight matrix variation referred to as $\Delta W$ from a client, for instance, from client 420-1 as shown in FIG. 4B, based on a previous formal iteration performed by AI model training system 400 corresponding to a previous weight matrix referred to as $W_P$ which is employed on each client of the plurality of clients. In some embodiments, the previous weight matrix was predetermined before the first formal iteration of the AI model training process and employed in the first formal iteration of the AI model training process. In other embodiments, the previous weight matrix is iteratively generated in the AI model training process. As in the above description, the weight matrix variation $\Delta W$ can be generated by means of an applicable weight matrix adjusting/optimizing methods or algorithms in the art, for instance, Gradient Descent.

At operation S2, predictor module 412 comprised in parameter server 410 generates a candidate weight matrix referred to as $W_C$ in accordance with the weight matrix variation and the previous weight matrix. The candidate weight matrix is generated by merging the weight matrix variation into the previous weight matrix, for instance, according to the following:

$$W_C = W_P + \Delta W \tag{1}$$

Here, $W_C$ is the candidate weight matrix;

$W_P$ is the previous weight matrix which was employed on each client of clients 420 in the performed formal iteration;

$\Delta W$ is the weight matrix variation.

At operation S3, parameter server 410 sends the candidate weight matrix to one of clients 420, for instance, client 420-2 as shown in FIG. 4B, which is not the same client corresponding to the client generating the weight matrix variation. Client 420-2 employs the candidate weight matrix on the AI model replica 450 deployed on client 420-2 and perform a testing iteration by means of the candidate weight matrix and corresponding data shards 452 which come from the dataset storage device 430. As a result of the testing iteration, a testing loss value of the AI model referred as to $L_C$ corresponding to the candidate weight matrix is generated according to the output of the testing iteration. Methods of generating a loss value from an output of a testing iteration in a training process for ANN-based AI model are known in the art.

At operation S4, parameter server 410 receives the testing loss value corresponding to the candidate weight matrix from client 420-2 which performs the testing iteration based on the candidate weight matrix.

At operation S5, evaluation module 414 of parameter server 410 performs an evaluation method in some embodiments of the present disclosure to determine whether the value of the testing loss is applicable according to the value of a previous loss referred to as $L_P$ and a predetermined range. The previous loss value corresponding to the previous weight matrix is generated by AI model training system 400 by means of parameter server 410 based on the output of the previous formal iteration in which the previous weight matrix is employed on each client of clients 420 to perform the formal iteration. Methods or algorithms of generating a loss value from an output of a formal iteration in a training process for an ANN-based AI model are known in the art. In some embodiments, evaluation module 414 calculates a difference value between the testing loss value and the previous loss value as:

$$\Delta L = L_C - L_P \tag{2}$$

Here, $\Delta L$ is a difference value between a testing loss value and a previous loss value;

$L_C$ is the testing loss value corresponding to $W_C$;

$L_P$ is the pervious previous loss value corresponding to $W_P$.

As the aforementioned description, $L_C$ and $L_P$ are respectively generated from respective outputs of a testing iteration and a previous formal iteration. Therefore, difference values $\Delta L$ correspond to respective outputs of a testing iteration and depict a variation trend of an output of the AI model training process which reflects whether the candidate weight matrix employed in the testing iteration is applicable to the AI model. For instance, the difference value $\Delta L$ is a negative value which illustrates the testing loss value corresponding to the output of the testing iteration has a decreasing trend by means of comparing the output of the testing iteration with the output of the previous formal iteration, conversely, the difference value $\Delta L$ is a positive value which depicts the testing loss value corresponding to the output of the testing iteration compared with the output of the previous formal iteration has an increasing trend. As described above with regard to FIG. 8, descent velocities characterized by slopes of points of a Loss-Weight curve indicates a converging speed of an AI model training method/process employed to train an ANN-based AI model. The difference value $\Delta L$ being a negative value indicates the AI model training process has a convergent trend. Furthermore, the converging speed of the AI model training process can be reflexed from the descent gradient of the difference value $\Delta L$ which is a negative value. Therefore, the evaluation module 414 can determine the testing loss value must be applicable to the AI model training process in response to the difference value being less than zero. In some embodiments of the present disclosure, however, the difference value $\Delta L$ being a positive value may be also applicable to the AI model training process in accordance with helping the AI model training process to escape from a local minimum trap as described above with respect to FIG. 8, or inapplicable to the AI model training process for causing a fluctuant output of the AI model training process. An acceptable rate may be calculated in accordance with a certain candidate weight matrix as according to the following acceptable rate function:

$$R(W_c) = \begin{cases} 1, & \Delta L < 0 \\ \exp\left(\dfrac{-\Delta L}{kL_p}\right), & \Delta L \geq 0 \end{cases} \tag{3}$$

Here, $R(W_c)$ is an acceptable rate in accordance with a certain candidate weight matrix Wc and the value of $R(W_c)$ is between 0 and 1;

$\Delta L$ is a difference value between a testing loss $L_C$ and a previous loss $L_P$;

$L_P$ is the previous loss corresponding to $W_P$;

k is an adjustment coefficient for adjusting the value of $R(W_c)$ to be involved into the value range between 0 and 1.

As described above, a candidate weight matrix $W_c$ must be applicable to the AI model training process in accordance with the corresponding $R(W_c)$ being equal to 1. In some embodiments, $R(W_c)$ of the candidate weight matrix $W_C$ is a value between 0 and 1 which is calculated by means of the aforementioned acceptable rate function in the present disclosure in response to the corresponding difference value $\Delta L$ being equal to or greater than zero. An acceptable rate range of $R(W_c)$ can be predetermined based on the actual requirement of various factors such as training time, dataset scale, computing resource or power consumption, etc. For instance, the acceptable rate range of $R(W_c)$ determined as [0.9, 1] or [0.5, 1]. The acceptable rate range of [0.9, 1] may reduce more risks which causes the AI model training process to be non-convergent but require more testing iteration times which may increase the training time and/or power consumption than the acceptable rate range of [0.5, 1]. Therefore, $R(W_c)$ provides a fully novel way to adjust and control the AI model training process based on the predetermined acceptable rate range of $R(W_c)$.

At operation S6, in response to a candidate weight matrix being applicable, the candidate weight matrix is then employed on each client of clients 420 by parameter sever 410/evaluation module 414 for performing a new formal iteration to obtain an output of the new formal iteration. In some embodiments, clients 420 initiatively request and pull the applicable candidate weight matrix to perform a new formal iteration. Then AI model training system 400 determines whether the output of the new formal iteration is consistent with an expectational value/result. In response to the output of the new formal iteration is consistent with the expectational value/result, the AI model training process is ended, and the trained AI model meets a criterion for using in actual scenarios. In response to output of the new formal iteration does not meet the expectational value/result, the AI model training process continues to generate a new weight matrix variation on each client of clients 420, then performs a new testing iteration based on a weight matrix variation and implement the weight matrix prediction disclosed in the present disclosure. The AI model training process continuously repeats performing formal iterations and a weight matrix prediction between two formal iterations until output of one formal iteration meets the expectational value/result and the AI model training process is ended.

At operation S7, in response to a candidate weight matrix being inapplicable, the candidate weight matrix is discarded, and an alternative candidate weight matrix referred to as $W_C'$ is generated by prediction module 412 by means of merging a different one of the plurality of weight matrix variations into the previous weight matrix to generate the alternative candidate weight matrix. For instance, the merging method is implemented as:

$$W_C' = W_P + \Delta W' \quad (4)$$

Here, $W_C'$, is the alternative candidate weight matrix;

$W_P$ is the previous weight matrix which was employed on each client of clients 420 in the performed formal iteration;

$\Delta W'$ is another weight matrix variation selected from the plurality of weight matrix variations.

Furthermore, prediction module 412 sends the alternative candidate weight matrix to another client of clients 420 to perform an updated testing iteration. In some embodiments, the another client of clients 420 is the same one client as the one of clients 420 which performed the testing iteration with the candidate weight matrix, for instance, client 420-2 as shown in FIG. 4B. Then parameter server 410 receives an updated testing loss value corresponding to the alternative candidate weight matrix from another client of clients 420, for instance, the client 420-N, which performs the updated testing iteration based on the updated candidate weight matrix. In accordance with receiving the updated testing loss value, the evaluation module 414 comprised in parameter server 410 performs a new evaluation to determine whether value of the updated testing loss is applicable according to the same evaluation method as the above disclosed at operation S5. In response to the updated testing loss value being applicable, parameter sever 410/evaluation module 414 employs the alternative candidate weight matrix on each client of clients 420 for performing a new formal iteration. The AI model training process continuously repeats performing formal iterations and the weight matrix prediction between two formal iterations until an output of one formal iteration meets the expectational value/result, then the AI model training process is ended.

It should be recognized that number and arrangement of elements or modules (the number of elements or modules and the arrangement thereof) in FIGS. 4A and 4B are provided for the purpose of illustration only. AI model training system 400 may comprise more and/or different elements or modules and different arrangements which can be implement by means of hardware, software or combination of the both. An element or module can also be merged with other elements or modules to construct a new element or module which can implement all functions of the merged elements or modules, for instance, prediction module 412 and evaluation module 414 can be merged together to construct a new module, or be split into two or more independent elements or modules which respective implement a part of function of the element or module.

Figure 5:
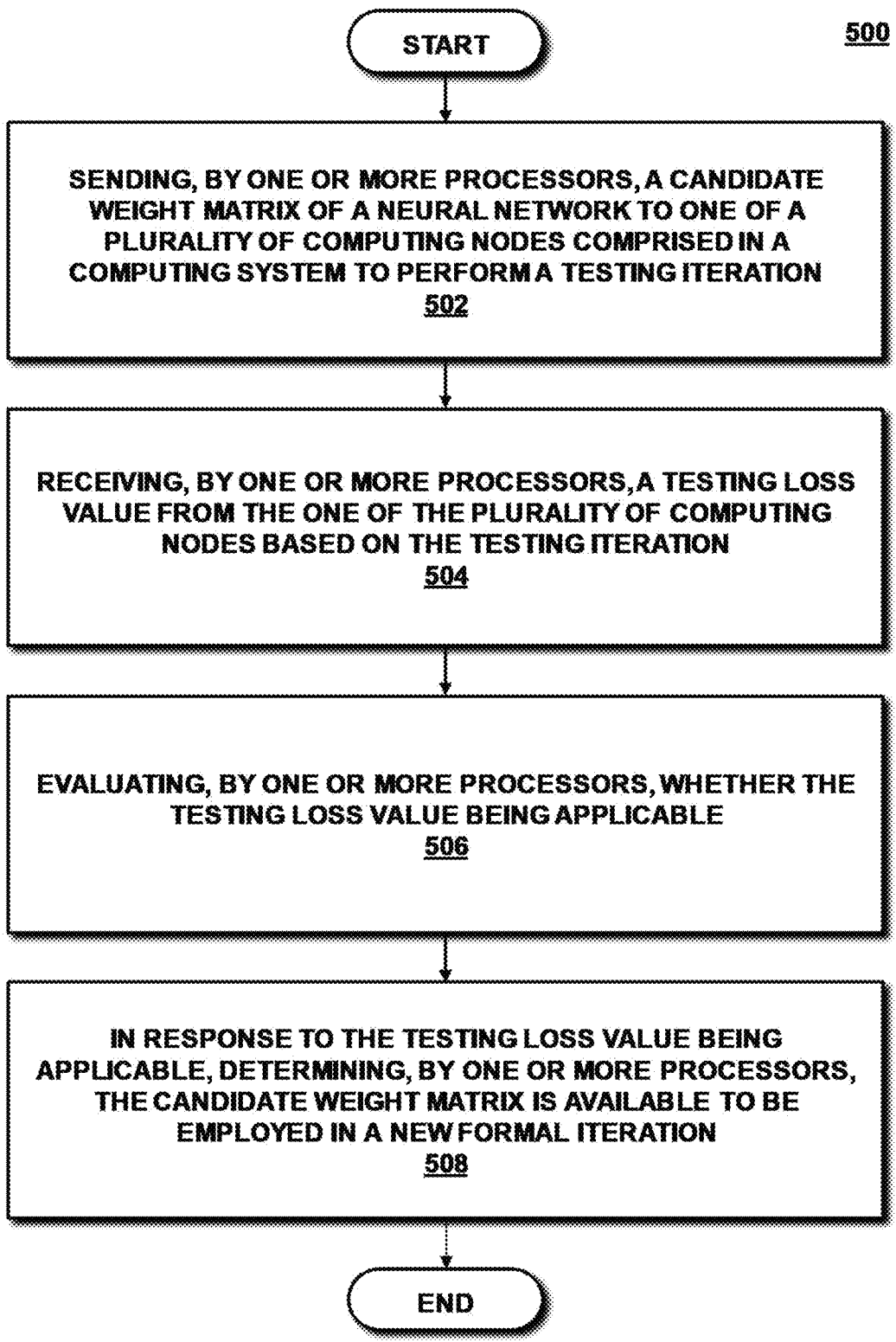
FIG. 5 depicts a flow chart illustrating an exemplary method for weight matrix prediction according to some embodiments.

With reference now to FIG. 5, in which a process flow chart 500 of a method for weight matrix prediction is depicted according to embodiments of the present disclosure. The process flow chart 500 is a corresponding method implemented by AI model training system 400 described herein in regard to weight matrix prediction in course of a training process on an ANN-based AI model by means of one or more processors in a distributed computing system as shown in FIGS. 4A and 4B, for instance, a cloud computing system.

At block 502, AI model training system 400 sends a candidate weight matrix of an ANN-based AI model to one of a plurality of computing nodes, for instance, client 420-2, comprised in a computing system, for instance, a distributed computing system, to perform a testing iteration.

At block 504, based on the testing iteration, AI model training system 400 receives a testing loss value from the one of the plurality of computing nodes, for instance, client 420-2.

At block 506, AI model training system 400 evaluates whether the testing loss value is applicable according to a previous loss value and a predetermined range. The previous loss value corresponding to a previous weight matrix is generated by AI model training system 400 by means of parameter server 410 based on the output of a previous formal iteration in which the previous weight matrix is employed on each client of clients 420 to perform the previous formal iteration. The predetermined range is a value range for evaluating whether the testing loss value is applicable in the AI model training process, for instance, the predetermined range is less than zero. As the evaluation process and evaluation methods described with reference to FIG. 4B, or not by means of the aforementioned evaluation methods, AI model training system 400 can evaluate whether the testing loss value is applicable in the AI model training process. For example, the testing loss value is applicable in accordance with the testing loss value is involved into a predetermined range such as less than zero.

At block 508, in response to the testing loss value being applicable according to the evaluating, AI model training system 400 determines that the candidate weight matrix is available to be employed in a new formal iteration.

It should be noted that herein the processing of weight matrix prediction is exemplarily and abstractly illustrated by the process flow chart 500 which does not explicitly exhaust or precisely limit entirety or components of the method of weight matrix prediction as shown in FIG. 5

Figure 6:
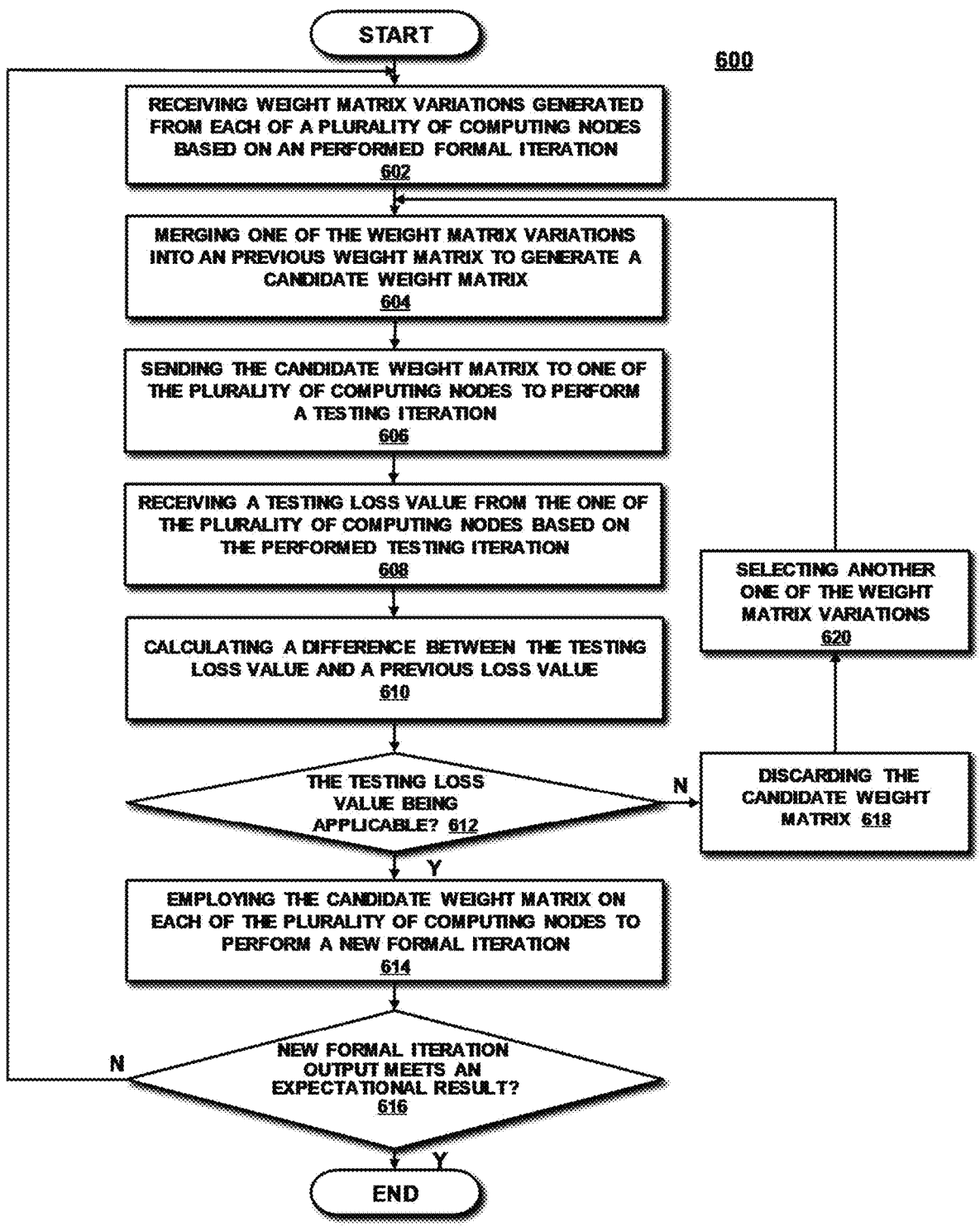
FIG. 6 depicts a flow chart illustrating an exemplary method of an AI model training process comprising weight matrix prediction according to some embodiments.

With reference now to FIG. 6, a process flow chart 600 of an exemplary method for weight matrix prediction to generate an optimized weight matrix for iterations in course of an AI model training process based on ANN is depicted according to embodiments of the present disclosure. The exemplary method depicted by the process flow chart 600 can be implemented by an AI model training system as AI model training system 400 shown in FIGS. 4A and 4B, and comprises the method for weight matrix prediction as shown in FIG. 5.

At block 602, AI model training system 400 receives a plurality of weight matrix variations generated from each of the plurality of computing clients/nodes based on a performed formal iteration. In some embodiments of the present disclosure, all computing nodes preforming an iterative calculation by means of the same weight matrix and generating outputs based on inputs coming from a training dataset is defined as a formal iteration.

At block 604, AI model training system 400 merges one of the plurality of weight matrix variations into a previous weight matrix to generate the candidate weight matrix. For instance, the weight matrix variations generated by client 420-1 is merged into the previous weight matrix to generate the candidate weight matrix. The previous weight matrix is employed on each of the plurality of computing nodes in the performed formal iteration. In some embodiments, the previous weight matrix is generated by a previous weight matrix prediction as shown in FIG. 4B. In other embodiments, the previous weight matrix is a given weight matrix by users of the AI model as a preset policy or logic.

At block 606, AI model training system 400 sends the candidate weight matrix to one of a plurality of computing nodes, for instance, client 420-2, to perform a testing iteration. As a result, a testing loss value is generated by the one of a plurality of computing nodes, for instance, the weight matrix variation referred to as ΔW as shown in FIG. 4B.

At block 608, AI model training system 400 receives a testing loss value from the one of the plurality of computing nodes based on the testing iteration. As aforementioned description, the testing loss value is generated by the one of a plurality of computing nodes in the testing iteration.

At block 610, AI model training system 400 calculates a difference value between the testing loss value and a previous loss value. The previous loss value is generated from the neural network in which the previous weight matrix is employed on each of the plurality of computing nodes in the performed formal iteration. As aforementioned description, methods of generating a loss value in an ANN-based AI model training process are well known in the art. In some embodiments, the difference value between the testing loss value and the previous loss value is generated by means of the aforementioned method as shown in FIG. 4B. In other embodiments, the difference value between the testing loss value and the previous loss value can be iteratively generated by means of any available statistic solution, for instance, bias, variance or Bayesian error, or replaced by one of predetermined values.

At block 612, AI model training system 400 evaluates whether the testing loss value is applicable, for instance, according to the previous loss value and a predetermined range. The previous loss value is generated from the ANN-based AI model by means of employing the previous weight matrix on each of the plurality of clients in the performed formal iteration. In some embodiments, the AI model training system 400 can perform the evaluate methods with the above-disclosed evaluation methods in the present disclosure corresponding to the AI model training process as shown in FIG. 4B. In response to the testing loss value being applicable according to the evaluating result, AI model training system 400 determines that the candidate weight matrix is available to be employed in a new formal iteration (612:Y) and the method proceeds to block 614. Conversely, in response to the testing loss value being inapplicable (612:N) according to the evaluating result, AI model training system 400 determines the candidate weight matrix is unavailable to be employed in a new formal iteration and the method proceeds to block 618.

At block 614, AI model training system 400 employs the candidate weight matrix which is determined to be available to be employed on in a new formal iteration on each of the plurality of clients 420 and performs the new formal iteration on each of the plurality of clients 420. As a result, AI model training system 400 generates an output of the new formal iteration in accordance with the candidate weight matrix.

At block 616, AI model training system 400 determines whether the output of the new formal iteration in accordance with the candidate weight matrix meets an expectational result. The expectational result is a set of preset indicators which indicates the AI model trained by means of AI model training system 400 has adequately filled needs and requirements for usage in actual work environments. In response to determining the output of the new formal iteration in accordance with the candidate weight matrix meets the expectational result (616:Y), AI model training system 400 ends the AI model training process. Conversely, in response to determining the output of the new formal iteration in accordance with the candidate weight matrix does not meet the expectational result (616:N), the method implemented by AI model training system 400 goes back to block 602 and performs a new training iteration which comprises the weight matrix prediction based on the new formal iteration until an output of a formal iteration meets the expectational result for ending the AI model training process.

At block 618, in response to the testing loss value being inapplicable according to the evaluating result generated at block 612, AI model training system 400 discards the candidate weight matrix which is corresponding to the inapplicable testing loss value.

At block 620, AI model training system 400 selects another one of the plurality of weight matrix variations received from each of the plurality of computing clients based on the performed formal iteration for repeatedly performing a weight matrix prediction disclosed in the present disclosure, then the method implemented by AI model training system 400 goes back to block 604.

As shown in FIG. 6, in response to selecting another one of the plurality of weight matrix variations at block 620, AI model training system 400 merges the another one of the plurality of weight matrix variations into the previous weight matrix to generate the alternative candidate weight matrix at block 604, for example, by means of the aforementioned merging method as shown in FIG. 4B. Furthermore, AI model training system 400 sends the alternative candidate weight matrix to another client to perform an updated testing iteration at block 606. Moreover, AI model training system 400 receives an updated testing loss corresponding to the alternative candidate weight matrix from another client at block 608. In accordance with receiving the updated testing loss, AI model training system 400 performs a new evaluation to determine whether value of the updated testing loss is applicable at block 610 and 612. In response to the updated testing loss value being applicable (612:Y), AI model training system 400 determines that the candidate weight matrix is available to be employed in a new formal iteration and employs the alternative candidate weight matrix on each of the plurality of clients 420 and performs the new formal iteration on each of the plurality of clients 420 at block 614. The AI model training process continuously repeats performing formal iterations and the weight matrix prediction between two formal iterations until an output of a formal iteration meets the expectational result and the AI model training process is ended.

The weight matrix prediction disclosed in the present can obviously increases efficiency and accuracy of a training process of an ANN-based AI model. Comparing with an AI model training process without the weight matrix prediction, an AI model training process comprising the weight matrix prediction obtains a better accuracy corresponding to the same times of (formal) iterations and less volatility in course of the training process.

Figure 7:
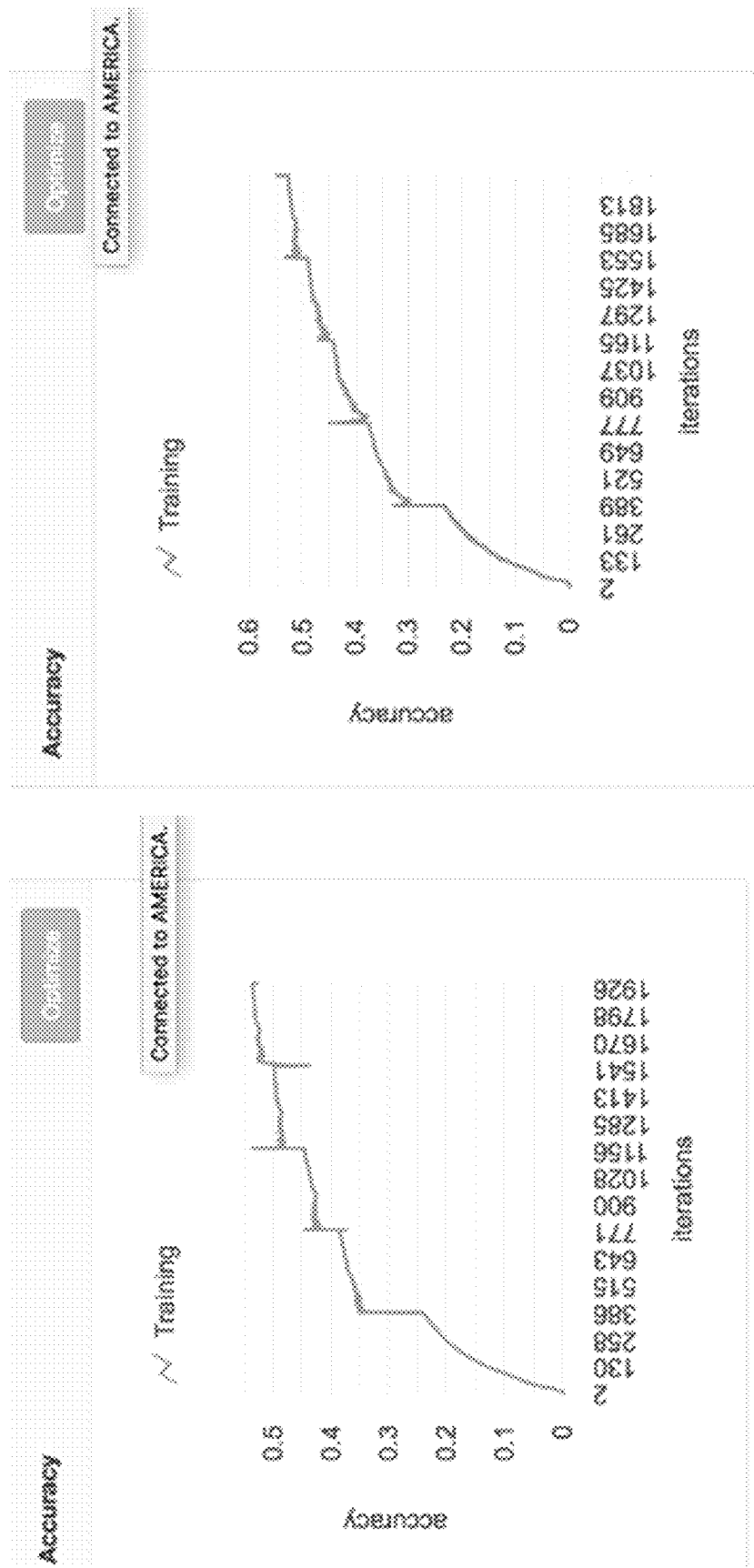
FIG. 7 depicts two curve graphs illustrating respective results of two exemplary AI model training processes according to some.

With reference now to FIG. 7, the left curve graph illustrates an AI model training process without the weight matrix prediction disclosed in the present disclosure, and the right curve graphs illustrates the same AI model training process comprising the weight matrix prediction under the fully same training conditions.

A vertical axis of a curve graph depicts an accuracy value of an output of the AI model training process. A horizon axis of a curve graph depicts iteration times of the AI model training process. As shown in FIG. 7, the right AI model training process comprising the weight matrix prediction obtains a better accuracy corresponding to the same times of (formal) iterations and less volatility in course of the training process than the left AI model training process without the weight matrix prediction.

It should be noted that the processing of weight matrix prediction (or achieved by AI model training system comprising weight matrix prediction) according to embodiments of this disclosure could be implemented by computer system/server 12 of FIG. 1.

The present embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present disclosure are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to the various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one operation, performed concurrently, substantially concurrently, in a partially or wholly temporally overlapping manner, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but they are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    sending, by one or more processors, a candidate weight matrix of a neural network to one of a plurality of computing nodes comprised in a computing system;
    generating, by one or more processors, a testing loss value based on the candidate weight matrix utilizing a testing iteration of a first one of the plurality of computing nodes to generate the testing loss value;
    receiving, by one or more processors, the testing loss value from the first one of the plurality of computing nodes;
    calculating, by one or more processors, a difference value between the testing loss value and a previous loss value;
    calculating, by one or more processors, an acceptable rate for the candidate weight matrix based on the difference value; and
    in response to determining that the calculated acceptable rate is within a predetermined rate range, determining that the candidate weight matrix may be employed in a formal iteration of training an AI model.

2. The method of claim 1, further comprising:
    employing, by one or more processors, the candidate weight matrix on each of the plurality of computing nodes to perform the formal iteration.

3. The method of claim 1, further comprising:
    generating, by one or more processors, the candidate weight matrix based on a performed formal iteration.

4. The method of claim 3, wherein generating the candidate weight matrix based on the performed formal iteration comprises:
    receiving, by one or more processors, a plurality of weight matrix variations generated from each of the plurality of computing nodes based on the performed formal iteration; and
    merging, by one or more processors, one of the plurality of weight matrix variations into a previous weight matrix to generate the candidate weight matrix, the previous weight matrix being employed on each of the plurality of computing nodes in the performed formal iteration.

5. The method of claim 4, wherein the first one of the plurality of computing nodes is different from a second one of the plurality of computing nodes generating the one of the plurality of the weight matrix variations.

6. The method of claim 4, wherein the previous loss value is generated from the neural network by means of employing the previous weight matrix on each of the plurality of computing nodes in the performed formal iteration; and
    wherein calculating the acceptable rate is performed in response to determining that the difference value is in a predetermined range.

7. The method of claim 6, wherein the predetermined range is less than zero.

8. The method of claim 6, wherein the predetermined range is equal to or greater than zero.

9. The method of claim 4, further comprising:
    in response to determining that the calculated acceptable rate is not within the predetermined rate range, discarding, by one or more processors, the candidate weight matrix.

10. The method of claim 9, further comprising:
    generating, by one or more processors, an alternative candidate weight matrix of the neural network;
    sending, by one or more processors, the alternative candidate weight matrix to another one of the plurality of computing nodes;
    performing, by the one or more processors, an updated testing iteration based on the alternative candidate weight matrix using an (AI) model replica on the another one of the plurality of computing nodes to generate an updated testing loss value;
    receiving, by one or more processors, the updated testing loss value from the another one of the plurality of computing nodes;
    calculating, by one or more processors, an updated difference value between the updated testing loss value and the previous loss value;
    calculating, by one or more processors, an updated acceptable rate for the alternative candidate weight matrix based on the updated difference value; and
    in response to determining that the calculated updated acceptable rate is within the predetermined rate range, determining that the alternative candidate weight matrix may be employed in a formal iteration of training the AI model.

11. The method of claim 10, wherein generating the alternative candidate weight matrix of the neural network comprises:
    selecting, by one or more processors, the another one of the plurality of weight matrix variations; and
    merging, by one or more processors, the another one of the plurality of weight matrix variations into the previous weight matrix to generate the alternative candidate weight matrix.

12. A system comprising:
    one or more computer readable storage media with program instructions collectively stored on the one or more computer readable storage media; and one or more processors configured to execute the program instructions to perform a method comprising:

sending a candidate weight matrix of a neural network to one of a plurality of computing nodes comprised in a computing system;

generating, by one or more processors, a testing loss value based on the candidate weight matrix utilizing a testing iteration of a first one of the plurality of computing nodes to generate the testing loss value;

receiving the testing loss value from the first one of the plurality of computing nodes;

calculating a difference value between the testing loss value and a previous loss value;

calculating, by one or more processors, an acceptable rate for the candidate weight matrix based on the difference value; and in response to determining that the calculated acceptable rate is within a predetermined rate range, determining that the candidate weight matrix may be employed in a formal iteration of training an AI model.

13. The system of claim 12, the method further comprising:

employing the candidate weight matrix on each of the plurality of computing nodes to perform the formal iteration.

14. The system of claim 12, the method further comprising:

generating the candidate weight matrix based on a performed formal iteration.

15. The system of claim 14, wherein generating the candidate weight matrix based on the performed formal iteration comprises:

receiving a plurality of weight matrix variations generated from each of the plurality of computing nodes based on the performed formal iteration; and merging one of the plurality of weight matrix variations into a previous weight matrix to generate the candidate weight matrix, the previous weight matrix being employed on each of the plurality of computing nodes in the performed formal iteration.

16. The system of claim 15, wherein the previous loss value is generated from the neural network by means of employing the previous weight matrix on each of the plurality of computing nodes in the performed formal iteration, and wherein calculating the acceptable rate is performed in response to evaluating determining that the difference value is in a predetermined range.

17. A computer program product, the computer program product comprising:

one or more computer readable storage media, and program instructions collectively stored on the one or more computer readable storage media, the program instructions comprising:

program instructions for sending a candidate weight matrix of a neural network to one of a plurality of computing nodes comprised in a computing system;

program instructions for generating, by one or more processors, a testing loss value based on the candidate weight matrix utilizing a testing iteration of a first one of the plurality of computing nodes to generate the testing loss value;

program instructions for receiving the testing loss value from the first one of the plurality of computing nodes;

program instructions for calculating, a difference between the testing loss value and a previous loss value; and program instructions for calculating, by one or more processors, an acceptable rate for the candidate weight matrix based on the difference value, and in response to determining that the calculated acceptable rate is within a predetermined rate range, determining that the candidate weight matrix may be employed in a formal iteration of training an AI model.

18. The computer program product of claim 17, the program instructions further comprising:

program instructions for generating the candidate weight matrix based on a performed formal iteration.

19. The computer program product of claim 18, wherein generating the candidate weight matrix based on the performed formal iteration comprises:

receiving a plurality of weight matrix variations generated from each of the plurality of computing nodes based on the performed formal iteration; and merging one of the plurality of weight matrix variations into a previous weight matrix to generate the candidate weight matrix, the previous weight matrix being employed on each of the plurality of computing nodes in the performed formal iteration.

20. The computer program product of claim 18, wherein the previous loss value is generated from the neural network by means of employing the previous weight matrix on each of the plurality of computing nodes in the performed formal iteration, and wherein calculating the acceptable rate is performed in response to determining that the difference value is in a predetermined range.

* * * * *